(No Model.)
W. C. BARKER.
CULTIVATOR.
No. 373,427. Patented Nov. 22, 1887.
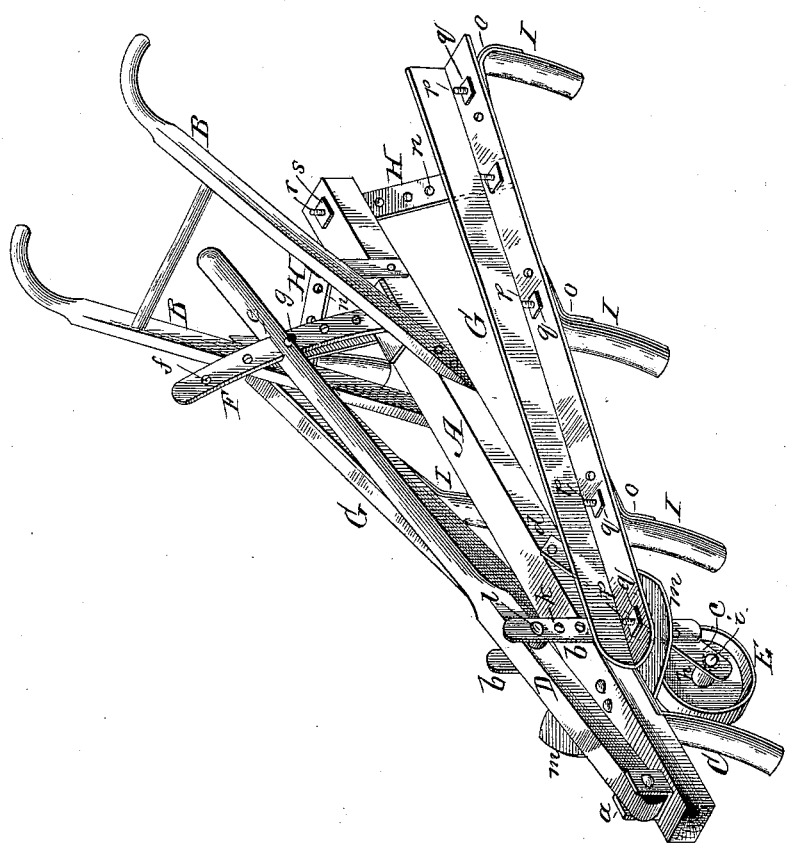
Witnesses
Harry S. Rohrer
L. L. Miller
Inventor
William C. Barker.
By his Attorney Chas. H. Fowler

UNITED STATES PATENT OFFICE.

WILLIAM CULLEN BARKER, OF CLARKSVILLE, MISSOURI.

CULTIVATOR.

SPECIFICATION forming part of Letters Patent No. 373,427, dated November 22, 1887.

Application filed April 11, 1887. Serial No. 234,392. (No model.)

*To all whom it may concern:*

Be it known that I, WILLIAM CULLEN BARKER, a citizen of the United States, residing at Clarksville, in the county of Pike and State of Missouri, have invented certain new and useful Improvements in Cultivators; and I do hereby declare that the following is a full, clear, and exact description of the same, reference being had to the annexed drawing, making a part of this specification, and to the letters and figures of reference marked thereon.

The present invention has relation to that class of cultivators in which are employed adjustable wings or tooth-bars, to which the teeth are connected, and means for raising and lowering the caster-wheel at the front end of the frame; and the invention consists in the details of construction, substantially as shown in the drawing, and hereinafter described and claimed.

In the accompanying drawing, which represents a perspective view of my invention, A designates the central beam, to which are suitably connected the handles B, and to the front end of the beam is connected the tooth C.

To the upper side of the beam is attached a bracket, $a$, to which is pivoted one end of a hand-lever, D, said lever having pivoted thereto links $b$, which in turn are pivoted to hangers $c$. These hangers carry the caster-wheel E, which is connected thereto in any preferred manner, and the hangers are pivoted to the sides of the beam, as shown at $d$. The handle near its rear end has a slot, $e$, through which passes a curved standard, F, secured to the beam A and having a series of holes, $f$, by which said handle or hand-lever D is held in its adjusted position by means of the pin $g$ entering a hole in said handle or lever and one of the series of holes $f$.

By the above-described devices the wheel E can be adjusted to gage the depth it is desired to cultivate, and when the hand-lever is lowered it depresses the wheel and the cultivator is lifted out of the ground, and the cultivator supported thereby may be wheeled from the field.

It will be noticed that the tooth C is located immediately in front of the wheel E, which serves two purposes, first as a cultivator-tooth, and, second, as a means for clearing all obstructions from the wheel and giving a smooth surface thereto.

In connecting the wheel to the hangers $c$, I prefer to provide said wheel with a short hub, $h$, and locate therein a bearing-tube, and through this tube I extend an axle, $i$, thereby forming a solid center and preventing the grass or weeds catching around it or winding up and clogging the wheel. Should the tubular bearing become worn, it can be removed and replaced by a new one. The links $b$ are provided with a series of holes, $k$, by which means the distance between their pivotal connection with the hand-lever D and hangers $c$ is increased or diminished, as circumstances require, the pin $l$ being removed and inserted in any one of the series of holes.

To the under side of the beam A, near the front end thereof, is suitably attached a supporting plate or plates, $m$, to which are bolted the front ends of the tooth-bars G, which are preferably formed of angle-iron, said bars near their rear end being connected to the beam A by braces H, provided with a series of holes, $n$. The bars G have connected to them teeth I, which teeth are bent double, as shown at $o$, as is also the tooth C, which gives to them additional strength at the point of connection with the bars G, and forms a support thereto and prevents them from bending at the shank portion. The teeth I are connected to the bars G by one or more bolts and nuts, $p$ $q$, whereby the teeth may be removed and replaced by new ones when so desired.

The tooth-bars G may be held nearer to or farther apart by means of the braces H and bolt and nut $r$ $s$.

The teeth I are formed of spring steel, and preferably concave at their front side, to render them more effective in lifting the soil, and any suitable number of these teeth may be used, as found desirable.

Having now fully described my invention, what I claim as new, and desire to secure by Letters Patent, is—

In a cultivator, the central beam, A, provided with tooth C, pivoted hangers $c$, and wheel E, supported by said hangers, and means for raising and lowering said wheel, consisting of the pivoted hand-lever D, adjustable links b, and rack-bar F, in combination with the adjustable angle-bars G, carrying detachable teeth I, said teeth bent double, as shown at o, to strengthen them at the point of connection with said bars, substantially as and for the purpose specified.

In testimony that I claim the above I have hereunto subscribed my name in the presence of two witnesses.

WILLIAM CULLEN BARKER.

Witnesses:
BENJAMIN F. YATES,
JNO. D. HACKER.